E. S. MIX.
POSITION INDICATOR.
APPLICATION FILED JAN. 21, 1918.

1,281,628.

Patented Oct. 15, 1918.

Inventor:
Edwin S. Mix
by his attorney
Farnum F. Dorsey

UNITED STATES PATENT OFFICE.

EDWIN S. MIX, OF ROCHESTER, NEW YORK, ASSIGNOR TO NORTH EAST ELECTRIC COMPANY, OF ROCHESTER, NEW YORK, A CORPORATION OF NEW YORK.

POSITION-INDICATOR.

1,281,628.     Specification of Letters Patent.     Patented Oct. 15, 1918.

Application filed January 21, 1918. Serial No. 212,939.

*To all whom it may concern:*

Be it known that I, EDWIN S. MIX, a citizen of the United States, residing at Rochester, in the county of Monroe and State of New York, have invented certain new and useful Improvements in Position-Indicators; and I do hereby declare the following to be a full, clear, and exact description of the invention, such as will enable others skilled in the art to which it appertains to make and use the same.

This invention relates to a device for indicating the position of some hidden movable member of a machine, such, for example, as the piston or the crank-shaft of an internal-combustion engine.

The object of the invention is to provide an indicator, for the purpose aforesaid, of simple and convenient form, which is adapted to be applied to and to coöperate with an external rotary member of the machine or engine, in such a manner as to indicate the position of such rotary member corresponding to a specific or desired position of the hidden part.

The invention accordingly comprises a body, preferably in the form of a metal plate, having means for engagement with an external rotary member of the machine or engine, and particularly with convenient abutments or projections on said member. The means or seats on the body for such engagement are so located and formed as to insure a definite angular position of the body of the indicator with reference to the rotary member. If, therefore, the body, while still so engaged with the rotary member, be brought also into a predetermined definite position, with relation to the stationary part or body of the machine or engine, by rotation of the mechanism, the hidden movable member will have been brought to the desired definite position. Accordingly, means are attached to or mounted on the body of the indicator for indicating a definite position of this body with respect to a stationary part of the engine. While such means may be adapted for reference directly to such stationary part, I have found it more convenient to adapt them for reference rather to the horizontal, upon the assumption that the stationary part of the machine or engine will, at the same time, be in a definite normal relation to the horizontal.

Figure 1:
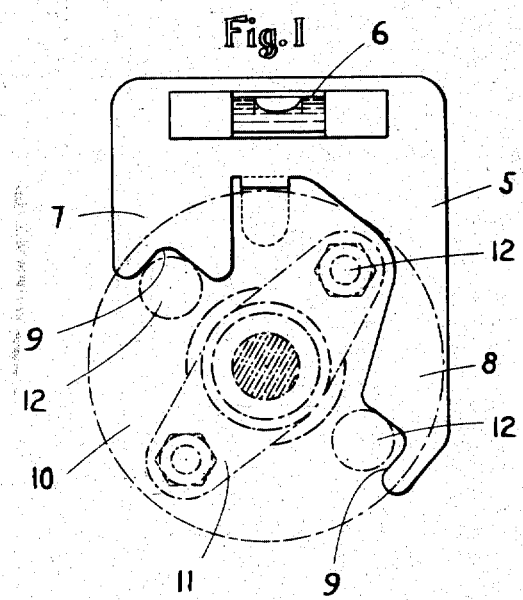
Figure 2:
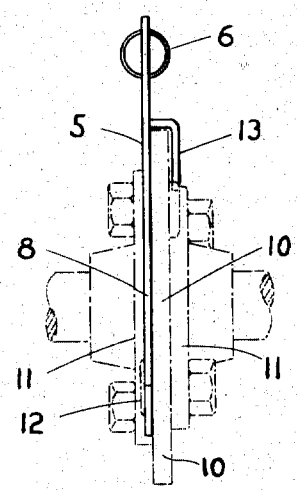

In the accompanying drawings Figure 1 is a front-elevation of an indicator embodying the present invention, shown in operative relation to a rotary member of an engine; and Fig. 2 is a side-elevation of the indicator.

The invention is illustrated as embodied in an indicator designed particularly for coöperation with a rotary member in the form of a shaft-coupling of well-known form, this coupling comprising diametrically arranged studs which serve conveniently as abutments to determine the angular relation of the indicator to the coupling.

The indicator comprises a body 5 of sheet-metal, having two depending portions or legs 7 and 8 each provided, at its lower end, with a rectangular recess or seat 9. The coupling with which the indicator coöperates comprises a disk 10 interposed between two cross-arms 11, and the ends of the arms are connected with the disk by studs, which are arranged diametrically with respect to the disk. These studs have smooth round heads 12, and the seats 9 coöperate with two of these heads, as shown, thus determining a definite angular relation of the body 5 to the coupling and to the shafts which it connects. To retain the body in position on the coupling, it is provided with a lug 13 which overhangs the upper edge of the disk 10.

With the indicator on the coupling in the position shown, it remains only to move the engine-mechanism until the indicator has been brought to a definite position with relation to the stationary portion of the engine. To determine this definite position the indicator is provided with a level-glass 6, mounted in an opening in the upper part of the body 5, and when the bubble in this glass indicates a level position it is known that the studs 12 have been brought to a definite desired position. Assuming that the engine is also in normal relation to the horizontal, it will then follow that its concealed parts, such as pistons and crank-shafts, are in a definite desired position. The position in question is usually that in which one of the pistons is at dead-center, and it will be obvious that the particular angle at which the seats 9 on the indicator are arranged will depend upon the design of the particular engine for which the indicator is used.

Where the indicator is used in connection with an engine on a vehicle, such engine being liable to departures from the normal horizontal and vertical positions of its stationary parts; it is necessary, before using the indicator, to bring the engine into normal position. The indicator may conveniently be used for this purpose also, by holding one of the lateral edges of the body 5 in engagement with a normally vertical surface of the engine and then moving the latter, if necessary, until the level-glass 6 is in level position.

The invention is not limited to the embodiment thereof herein described and illustrated in the accompanying drawings, but it may be embodied in various other forms within the scope of the following claims.

I claim:

1. A position-indicator, for an engine provided with a horizontal shaft and a coupling thereon having projecting studs, said indicator comprising means for engaging said studs to fix the angular relation of the indicator to said shaft, and means for indicating a definite position of the indicator with reference to some other part of the engine.

2. A position-indicator, for an engine provided with a horizontal shaft and a coupling thereon having projecting studs, said indicator comprising a plate provided with two seats, at its edge, for engaging two of said studs simultaneously, and with a lug for engaging the body of the coupling to maintain engagement of the plate with the studs; and a level-indicator carried by said plate.

EDWIN S. MIX.

Copies of this patent may be obtained for five cents each, by addressing the "Commissioner of Patents, Washington, D. C."